Aug. 17, 1971     R. McFEDRIES, JR., ET AL     3,600,267
PACKAGING FILM
Filed April 14, 1969
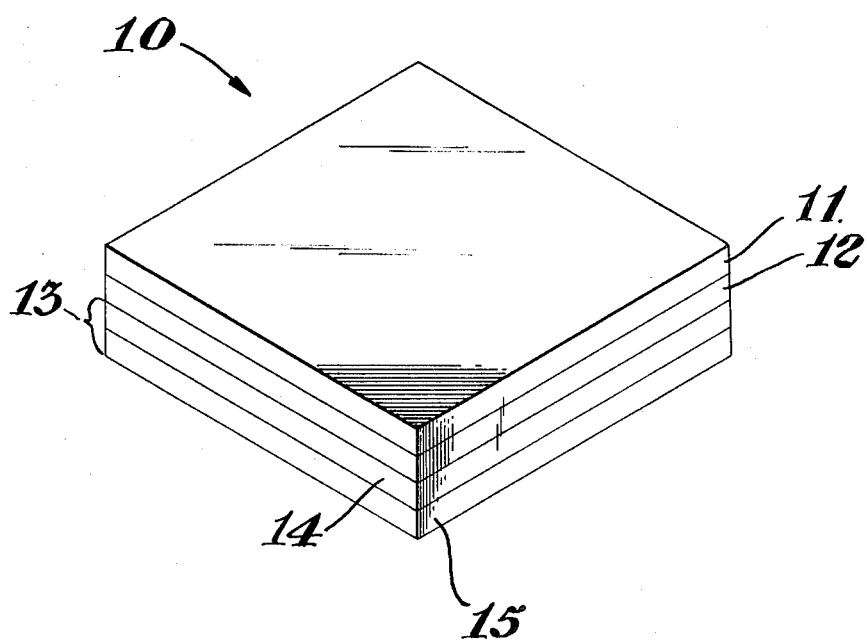
INVENTORS.
Robert McFedries, Jr.
Don W. Seidler
BY
Merlin B Davey
AGENT United States Patent Office 3,600,267
Patented Aug. 17, 1971

3,600,267
PACKAGING FILM
Robert McFedries, Jr., Bay Village, and Don W. Seidler, Rocky River, Ohio, assignors to The Dow Chemical Company, Midland, Mich.
Filed Apr. 14, 1969, Ser. No. 815,576
Int. Cl. B32b 27/08, 27/10, 27/32
U.S. Cl. 161—165
5 Claims

ABSTRACT OF THE DISCLOSURE

A packaging film having improved machineability by virtue of a lower heat seal temperature, wider sealing range and good seal strength wherein the heat seal layer comprises polyethylene homopolymer and an ethylene-vinyl acetate copolymer.

---

In the packaging of various food products such as cheese, meat, coffee, tobacco and drugs in a flexible, heat sealable wrapper, difficulty has been experienced in providing a desired combination of heat seal strength and low heat seal temperature. A low heat seal temperature is desired so that surface burn-through doesn't occur and in order to permit more rapid sealing.

In accordance with this invention these desiderata are obtained and an improved machineable thermoplastic film is provided by employing a combination heat seal layer which consists of polyethylene homopolymer and an ethylene-vinyl acetate copolymer. Packaging films having the combination heat seal layer of this invention may be heat sealed at lower temperatures and over a wider sealing range with no significant loss of seal strength.

The invention is further illustrated by the accompanying drawing wherein an enlarged cross-sectional view of one embodiment of multilayer film in accordance with this invention is depicted.

Referring to the drawing, laminate 10 comprises a backing material 11, coating layer 12 and heat sealing layer 13. Heat sealing layer 13 consists of a polyethylene homopolymer layer 14 and an ethylene-vinyl acetate copolymer layer 15.

Backing material 11 may be any flexible packaging film, such as, for example, aluminum foil, polyester film, nylon film, paper, cellophane, oriented polypropylene or acetate film, advantageously, backing materials such as the polyester films, nylon films and oriented polypropylene films may be coated with a barrier layer such as a copolymer of vinylidene chloride and acrylonitrile to improve the water vapor and gas transmission characteristics.

If desired, primers or adhesives such as polyethylenimine may be employed to enhance the adherence of the various layers of the packaging film to each other as is well-known in the art.

The backing material or support film employed is not critical, and may be chosen to provide the particular properties such as flexibility, clarity, strength and barrier properties as desired. The critical feature of this invention is that the heat seal layer which is carried by the support material consists of an inner layer of a homopolymer of ethylene and an outer layer of an ethylene-vinyl acetate copolymer.

The polyethylene portion of the heat seal layer is advantageously from 0.5 to 1.5 mils in thickness and the ethylene-vinyl acetate layer is advantageously from 0.5 to 1 mil thick. The polyethylene advantageously has a melt index of from about 2 to about 40, preferably from about 5 to about 20. The preferred polyethylene homopolymers have a density of from about 0.910 to 0.940, most advantageously from about 0.910 to 0.925. Copolymers of from 4 to 40 weight percent vinyl acetate and from 96 to 60 weight percent ethylene may be employed in accordance with this invention. The preferred copolymers contain from 15 to 30 weight percent vinyl acetate and, correspondingly, from 85 to 70 weight percent ethylene in chemically combined form. The polyethylene and ethylene-vinyl acetate layers may be applied separately as by sequential melt extrusion techniques or they may be applied simultaneously by coextrusion and laminating.

The invention is further illustrated by the following examples and comparative data.

EXAMPLE 1

A backing material of 0.6 mil thick oriented polypropylene film which was coated on one side with a 0.1 mil layer of a copolymer of about 85 weight percent vinylidene chloride, 13 weight percent acrylonitrile and 2 weight percent 2-ethyl hexyl acrylate was melt extrusion coated with polyethylene homopolymer having a melt index of 5 and a density of .917 (15 lbs. per ream rate where "ream" stands for 500 24" x 36" sheets) and thereafter with a copolymer of 28 weight percent vinyl acetate and 72 weight percent ethylene (15 lbs. per ream rate). The resulting multilayer film had the following properties:

Tensile strength:
    lbs./in. width _____ 18.4
    lbs./sq. in. (calculated) _____ 6800
Mullen Burst:
    lbs. polypropylene up _____ 44
    lbs. polypropylene down _____ 43

When heat sealed at 220° F. the heat seal strength (average of 5 tests) was 3.6 lbs. per lineal inch. At 250° F. the heat seal strength was 6.4 lbs. per lineal inch. At 310° F. the heat seal strength was 7.6 lbs./in.

For comparison another portion of the support layer was coated with 30 lbs. per ream of the same ethylene-vinyl acetate copolymer. (The polyethylene layer was omitted.) The tensile strength was 17.6 lbs./inch of width and 7050 lbs./sq. inch (calculated). The Mullen Burst was 45 lbs. The heat seal strength values were as follows:

220° F. _____ 2.84
250° F. _____ 3.04
310° F. _____lbs./in__ 3.6

EXAMPLE 2

Four films were prepared as follows: Film 1 consisted of 13 lbs. per ream tissue paper having an overcoat of 5 lbs. per ream polyethylene adhered to 0.35 mil thick aluminum foil over which a sealing layer of 15 lbs. per ream polyethylene and 10 lbs. per ream of the ethylene-vinyl acetate copolymer employed in Example 1 were extrusion coated.

Film 2 consisted of 25 lbs. per ream pouch paper adhered to 0.35 mil thick aluminum foil by means of 7 lbs. per ream of a copolymer of 97 weight percent ethylene and 3 weight percent acrylic acid. The sealing layer was 15 lbs. per ream of the same ethylene-acrylic acid copolymer extruded at 525 °F. onto the aluminum foil.

Film 3.—the same as Film 2 except that the sealing layer was extruded at 625° F.

Film 4 consisted of 25 lbs. per ream pouch paper adhered to 0.35 mil thick aluminum foil by means of 7 lbs. per ream polyethylene. The sealing layer was 10 lbs. per ream of the above ethylene-acrylic acid copolymer over which 10 lbs. per ream of polyethylene having a melt index of 5 was extrusion coated.

These films were evaluated for heat seal strength and tear strength. The results were as follows:

| Film: | Minimum heat seal, (° F.) | Heat seal strength, (Lbs./in.) | Heat seal strength, 300° F., (Lbs./in.) | Elmendorf tear Machine die | Elmendorf tear Transmission die |
|---|---|---|---|---|---|
| 1 | 250 | 6.42 | 9.52 | 195 | 230 |
| 2 | 260 | 2.90 | 3.74 | 102 | 93 |
| 3 | 255 | 4.51 | 4.06 | 104 | 93 |
| 4 | 255 | 3.62 | 3.76 | 100 | 108 |

It is thus seen that Film 1, which is in accordance with the present invention, heat seals at a lower temperature while at the same time affording exceptional heat seal strengths and tear strengths in comparison with films of the known art.

EXAMPLE 3

Four separate films were prepared by employing various heat sealing layers in accordance with this invention. In each case the backing material was a 1.4 mil thick layer of cellophane which was coated on one side with a 0.1 mil layer of a vinylidene chloride-acrylonitrile copolymer containing about 80 weight percent of vinylidene chloride in chemically combined form. The heat sealing layers were applied over a thin coating of polyethylenimine and were as follows wherein in each case the ethylene-vinyl acetate copolymer (EVA) was the same as used in Example 1 above.

Film A—15 lbs./ream polyethylene having a density of 0.917 and a melt index of 5 and 15 lbs./ream of EVA.

Film B—15 lbs./ream of polyethylene having a density of 0.917 and a melt index of 12 and 15 lbs./ream of EVA.

Film C—9 lbs./ream of polyethylene employed in Film A and 20 lbs./ream of EVA.

Film D—22 lbs./ream of polyethylene employed in Film A and 7 lbs./ream of EVA.

Heat seal strengths were determined on an Instron tester at 12 in./min. crosshead speed, 1" jaw separation, 5 in./min. chart speed and a 20–50 lb. load scale on heat seals made at 200, 250 and 300° F. at 40 p.s.i. and 1 sec. dwell. The results (lbs./in.) were as follows:

| | Heat seal strength at— | | |
|---|---|---|---|
| | 200° F. | 250° F. | 300° F |
| Film: | | | |
| A | 11.4 | 20.2 | 20.3 |
| B | 12.1 | 19.2 | 20.0 |
| C | 11.0 | 19.0 | 20.5 |
| D | 8.1 | 18.4 | 19.1 |

We claim:

1. A packaging film comprising a backing material and a heat seal layer, said heat seal layer consisting of a layer of a polyethylene homopolymer next to the backing material and an outer layer of an ethylene-vinyl acetate copolymer containing from 4 to 40 weight percent of vinyl acetate in chemically combined form next to the polyethylene homopolymer.

2. Packaging film of claim 1 wherein the backing material is oriented polypropylene which is coated on at least one side with a vinylidene chloride-acrylonitrile barrier layer.

3. Packaging film of claim 2 wherein the sealing layer is a film of polyethylene overcoated with a film of a copolymer of about 28 weight percent vinyl acetate and about 72 weight percent of ethylene.

4. Packaging film of claim 1 wherein the polyethylene homopolymer layer is from 0.5 to 1.5 mils thick and the ethylene-vinyl acetate copolymer layer is from 0.5 to 1 mil thick.

5. Packaging film of claim 1 wherein the polyethylene homopolymer has a density of from about 0.910 to 0.940.

References Cited

UNITED STATES PATENTS

| 3,075,864 | 1/1963 | Anderson | 161—165 |
| 3,370,972 | 2/1968 | Nagel et al. | 117—75 |
| 3,445,324 | 5/1969 | Curler et al. | 99—171 |
| 3,446,631 | 5/1969 | Samuels | 161—165 |
| 3,459,591 | 8/1969 | Konishi et al. | 161—254 |
| 3,483,076 | 12/1969 | Resz et al. | 161—256 |
| 3,488,252 | 1/1970 | Lamar | 117—76 |

JOHN T. GOOLKASIAN, Primary Examiner

G. W. MOXON II, Assistant Examiner

U.S. Cl. X.R.

99—171LP; 117—76P, 76F, 138.8A, 138.8E, 161UZ; 161—252, 254